United States Patent [19]
Evans

[11] 3,843,884
[45] Oct. 22, 1974

[54] X-RAY GAUGING METHOD AND APPARATUS WITH STABILIZED RESPONSE

[75] Inventor: Howard J. Evans, Columbus, Ohio
[73] Assignee: Industrial Nucleonics Corporation, Columbus, Ohio
[22] Filed: Sept. 20, 1971
[21] Appl. No.: 181,837

[52] U.S. Cl.................. 250/272, 250/273, 250/389
[51] Int. Cl. .......................................... G01n 23/22
[58] Field of Search.......... 250/51.5, 83.3 D, 83.6 R

[56] References Cited
UNITED STATES PATENTS

| | | | |
|---|---|---|---|
| 2,445,305 | 7/1948 | Hochgesang........................ | 250/385 |
| 2,983,819 | 5/1961 | Bigelow et al. ..................... | 250/51.5 |
| 3,012,140 | 12/1961 | Pellissier............................. | 250/51.5 |
| 3,100,261 | 8/1963 | Bigelow .............................. | 250/51.5 |
| 3,119,036 | 1/1964 | Braestrup............................ | 250/51.5 |
| 3,366,790 | 1/1968 | Zagerites ............................ | 250/385 |
| 3,412,249 | 11/1968 | Hanken............................... | 250/385 |
| 3,418,474 | 12/1968 | Spergel ............................... | 250/385 |

Primary Examiner—James W. Lawrence
Assistant Examiner—C. E. Church
Attorney, Agent, or Firm—Allan M. Lowe; C. Henry Peterson

[57] ABSTRACT

Disclosed is a system for measuring the thickness of a zinc coating on an iron sheet wherein the coating and substrate are irradiated by a continuous X-ray beam source. The beam is propagated in a first or positive direction away from the source through a reference chamber to the coating and substrate. By fluorescence of the coating and substrate in response to the X-ray irradiation, secondary X-rays are derived and propagate in a second or negative direction generally towards the source. The intensity of the negatively directed X-rays is determined with a measuring chamber concentric with the reference chamber. The reference and measuring chambers include a noble gas that is ionized in response to the X-rays impinging thereon. Gases are permitted to flow between the two chambers by a structure which prevents coupling of ions between the chambers, and whereby the relative sensitivity of the two chambers is equalized. Responses from the two chambers are combined to provide a signal that is independent of intensity variations of the X-ray beam source. The combined signal is electronically processed to provide an output signal directly proportional to the zinc coating. Standardization of the gauge is performed by substituting first and second samples, respectively having no zinc and a predetermined amount of zinc on an iron substrate, for the sheet being measured for coating thickness.

41 Claims, 4 Drawing Figures

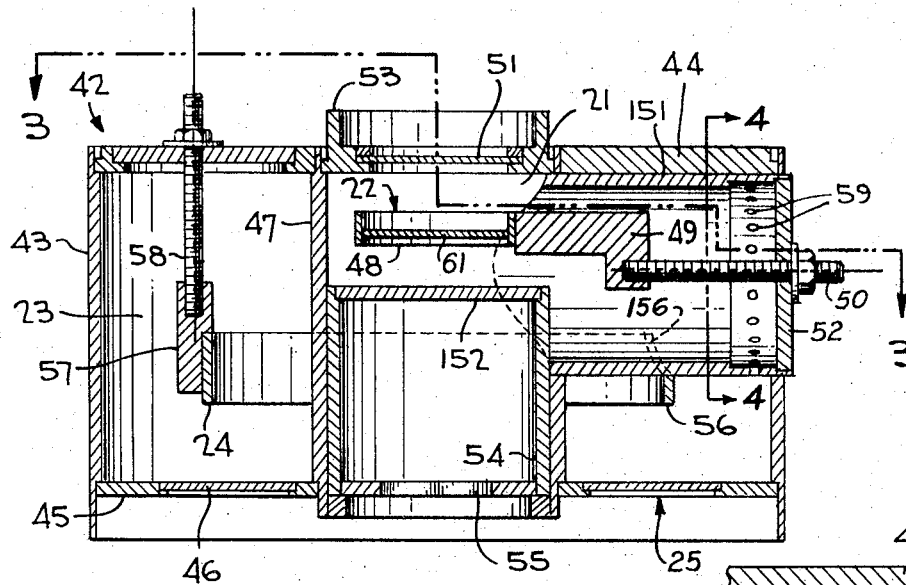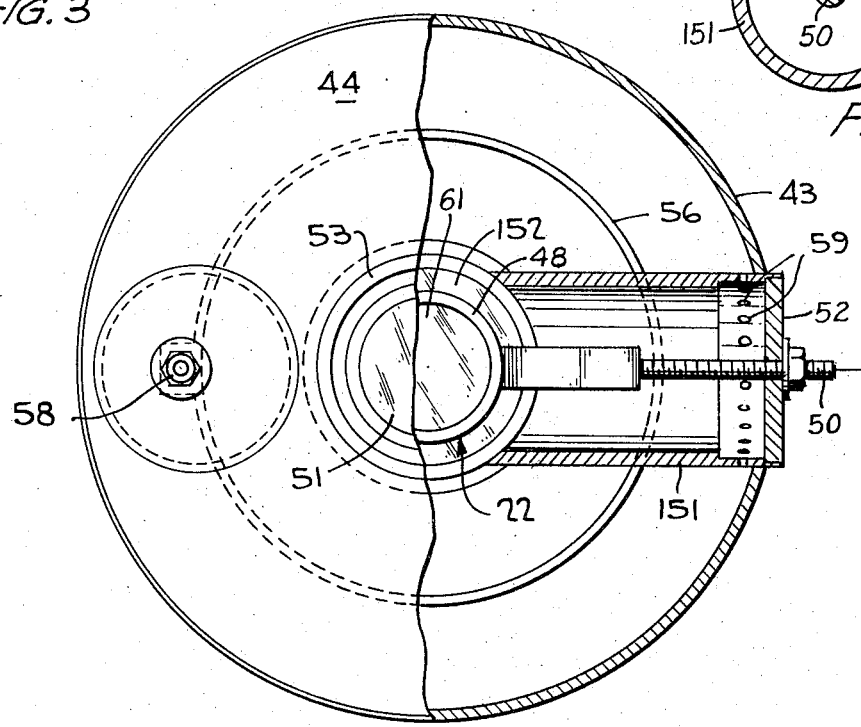

X-RAY GAUGING METHOD AND APPARATUS WITH STABILIZED RESPONSE

FIELD OF INVENTION

The present invention relates generally to X-ray gauges and, more particularly, to an X-ray gauge wherein a reference chamber is positioned in the path of an X-ray beam impinging on a material being monitored.

BACKGROUND OF THE INVENTION

The principles of an X-ray gauge for monitoring a property of a material are well known. In response to an X-ray beam the material being irradiated fluoresces to emit secondary X-rays that are detected in an ionization chamber located on the same side of the material as the X-ray source. A recognized problem concerned with the use of X-rays for monitoring a material property is the tendency of the X-ray beam intensity to drift.

One type of system developed in the prior art to compensate for fluctuations in the intensity of the X-ray beam of an X-ray gauge positioned on the same side of the material as the source includes a standard specimen fabricated of a material similar to the material being monitored. The standard sample intercepts a portion of the radiation from the X-ray and fluoresces, thereby producing X-ray radiation. The remainder of the X-ray beam impinges on the material being gauged, causing fluorescence and energy to be propagated back in the same general direction as the source. Separate detectors respond to the X-ray energy from the standard sample and material being measured to derive signals which are combined to derive an indication substantially independent of fluctuations in the intensity of the X-ray beam. In one particular embodiment of devices of this nature, the standard sample includes a central aperture or diaphragm through which the X-ray beam is transmitted.

There appear to be certain inherent disadvantages in X-ray gauges of the aforementioned type. One of the serious disadvantages appears to be that in order to derive a sufficient amount of backscattered energy from the standard sample, a significant portion of the beam must be intercepted by the sample instead of impinging on the gauged material. Otherwise, the intensity of a signal derived in response to detection of the energy derived from the standard sample will be insufficient to enable an accurate indication of the beam intensity variations to be derived. A further problem in dividing the beam into two different portions, one of which strikes the standard sample and another of which is transmitted to the material being gauged, is that there are inhomogeneities in the intensity of the beam intensity as a function of beam geometry. In other words, the current density in one portion of the beam, for example, the beam center, may be materially different from the current density in a second section of the beam, for example, the beam periphery. If there is relative movement of the standard sample and beam, as frequently occurs in response to mechanical vibrations in an industrial environment, these variations in beam intensity are reflected in the intensity of radiation derived from the standard sample.

Another problem with the described prior art gauges is that there is usually a requirement for two separate chambers, at disparate locations, to be provided. Thereby, sensitivities of the two different chambers are subject to independent fluctuations because of pressure and gas contamination changes in one chamber which may not occur in the other chamber. If the two chambers have varying sensitivities, the output signals derived thereby can vary independently in a random manner and the indication of the material property is subject to errors.

BRIEF DESCRIPTION OF THE INVENTION

In accordance with the present invention, an X-ray gauge with compensation for fluctuations of beam intensity is provided by providing an X-ray detector chamber so that it transmits the X-ray beam which thereafter impinges on the material. Thereby, the entire beam impinging on the material being monitored also is transmitted through the X-ray detector chamber employed for deriving a reference signal. In one preferred embodiment, the reference X-ray chamber includes an ionizable gas, such as the noble gas argon, that removes only a small portion, on the order of one to ten percent, of the energy from the beam. Since the entire beam is directed through the reference chamber, problems of the described prior art gauges wherein the beam is divided into two segments, are avoided.

As in the prior art, a measuring chamber responds to energy propagated from the material being monitored in a direction opposite from the direction the beam is propagated towards the material from the source. The output signal of the measuring chamber is indicative of a property, such as the thickness of a coating on a substrate, of the material. The signal from the measuring chamber is combined with the signal from the reference chamber to derive a signal indicative of the property and independent of variations in the intensity of the X-ray beam.

In accordance with an important aspect of the invention, the relative sensitivities of the measuring and reference chambers are always maintained the same. To this end, both chambers are filled with the same noble gas and means is provided to enable the noble gas to flow from one chamber to the other. Thereby, the pressure and other physical properties, such as purity, of the gases in the two chambers are maintained the same.

A problem in allowing gases to circulate between the reference and measuring chambers is that ions in the two chambers, which are derived in response to the intensity of the X-ray beam directed toward the materials from the source in a first or positive direction and the radiation propagated from the material in a second or negative direction opposite from the first direction, must not migrate between the two chambers. If ions migrate from one chamber to the other, the signals derived by the two chambers are affected and no reliable indication of the intensities of the positively and negatively directed radiations is obtained. In the present invention, migration of ions out of the reference chamber is prevented because the electric field strength within the chamber is greater than the diffusion forces of the ions in the chamber. The very high electric field strength, in effect, captures the ions in the reference chamber and prevents them from migrating to the measuring chamber. Migration of ions from the measuring chamber, which has a lower electric field strength than the reference chamber, is prevented by providing relatively small, cylindrical bores in a wall separating the two chambers from each other. The bores have openings into the measuring chamber at a location generally removed from the region where ions are developed in the measuring chamber. The length of the cylindrical bores is sufficiently great relative to the mean free path of an ion that the few ions which enter the bores from the measuring chamber impinge on the walls of the bore so that their charge is dissipated and prevented from entering the reference chamber.

One particular use of the invention concerns measuring the thickness of a zinc coating on an iron or steel substrate. In such a use, the measuring chamber includes an aluminum window for substantially blocking radiation from the ion substrate, while allowing radiation from the zinc coating to enter the measuring chamber. The current derived from the measuring chamber is an expoential function of the zinc coating thickness over a range of between 0 and approximately 1.6 ounces of zinc per square foot of iron substrate. Above this range it has been found that the exponential function no longer applies. Circuitry is provided to correlate the output of the measuring chamber with coating thickness over the stated range.

It is, accordingly, an object of the present invention to provide a new and improved X-ray gauge.

Another object of the invention is to provide a new and improved X-ray gauge particularly adapted to compensate for variations in X-ray beam intensity.

Another object of the invention is to provide an X-ray gauge wherein compensation for beam intensity variations is provided even though only a small percentage of the beam energy is absorbed by a reference chamber.

A further object of the invention is to provide an X-ray gauge employing reference and measuring chambers that are maintained at the same relative sensitivity.

A further object of the invention is to provide an X-ray gauge employing reference and measuring chambers having ionizable gases which flow between the chambers and wherein ion migration between the chambers is prevented.

Still another object of the invention is to provide a new and improved X-ray gauge particularly adapted for use in conjunction with measurements of the thickness of a coating on a metal substrate.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 2 is a cross-sectional view of a preferred embodiment of an ionization detector employed in the present invention;

FIG. 3 is a top view, partially in section, of the detector of FIG. 2, taken through the line 3—3, FIG. 2; and FIG. 4 is a cross sectional view, taken through the line 4—4 of FIG. 1.

DETAILED DESCRIPTION OF THE DRAWING

Figure 1:
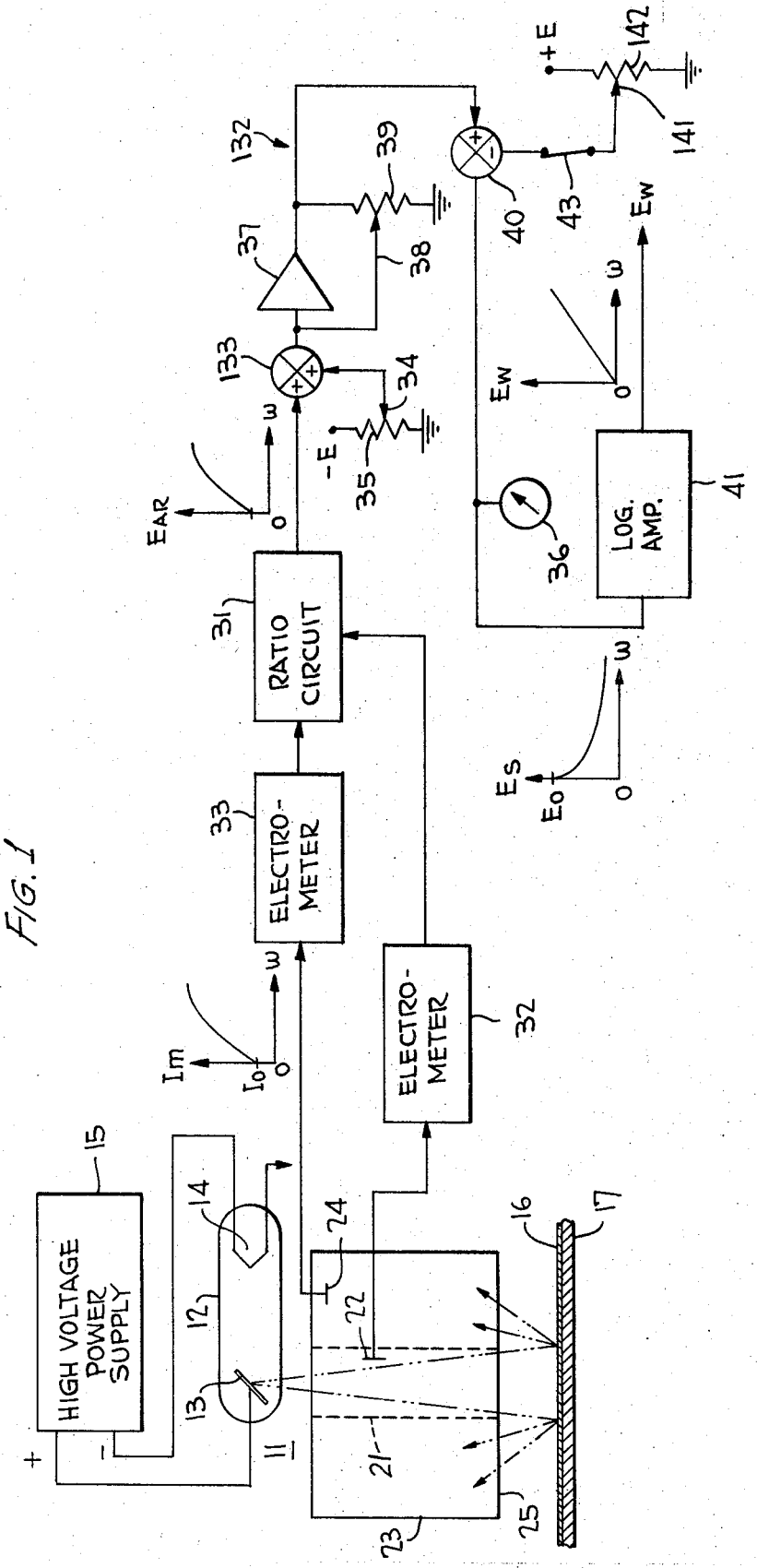
FIG. 1 is a schematic view of the improved X-ray gauge of the present invention in combination with apparatus for processing the signal derived from the gauge to indicate the thickness of a zinc coating on an iron substrate.

Reference is now made to FIG. 1 of the drawing wherein there is illustrated a continuous beam X-ray point source 11 comprising X-ray tube 12 which includes anode 13 and filament 14. The beam continuously derived from source 11 is regulated with regard to spectral properties by connecting a regulated high voltage power supply 15 between anode 13 and cathode 14. The beam intensity is regulated, as effectively as possible, by providing the power supply 15 with current regulation. By regulating the anode current of source 11, and therefore the intensity of the X-ray beam emitted thereby, the fluctuation noise in the beam is maintained at a relatively constant level despite aging of the tube 12.

The beam constantly derived from source 11 propagates in a first or positive direction to irradiate the material being monitored, zinc coating 16 on steel or iron substrate 17. In response to the energy in the beam, zinc coating 16 and substrate or sheet 17 fluoresce at different energy levels to produce secondary X-rays that propagate in a second or negative direction opposite from the first direction. The zinc coating fluoresces at an energy level of 8.5 KeV, while the iron substrate 17 fluoresces at an energy level of 6.4 KeV. In addition, Compton radiation is derived from iron substrate 17 at energy levels lower than the beam energy levels.

The X-ray beam is transmitted through a reference chamber 21 prior to irradiating coating 16 and substrate 17. Reference chamber 21 includes an ionizable gas, preferably a noble, i.e., inert, gas, such as argon, which is ionized in response to energy absorbed thereby from the X-ray beam in the presence of a collecting potential. The gas absorbs approximately only 1 percent of the energy of the beam derived from source 11 so that the beam passes through chamber 21 with a very small degree of attenuation. To monitor the intensity of the beam derived from source 11, chamber 21 is provided with an electrode 22 on which is derived signal current having a magnitude indicative of the intensity of the beam derived from source 11.

At the outlet of chamber 21 a rectangular aperture is provided, whereby the beam is shaped into a rectangular cross section to enable greater definition of the thickness of coating 16 to be ascertained at the edges of the substrate 17 where spooling (thick coating at the edges of the sheet) is likely to occur. It is thus seen that the beam which irradiates coating 16 and substrate 17 is intercepted by reference chamber 21. Thereby, an accurate indication of the intensity of the beam impinging on coating 16 and iron sheet 17 is derived at electrode 22.

Concentric with reference chamber 21, between source 11 and substrate 17, is measuring chamber 23, positioned to be responsive to negatively directed X-ray radiation from coating 16 and iron sheet 17. Measuring chamber 23 also includes an ionizable gas which is ionized in response to the X-ray radiation reaching it. Electrode 24 in chamber 23 derives a signal current having a magnitude proportional to the amount of ionization of the gas in chamber 23.

Preferably, the gases in chambers 21 and 23 have the same relative sensitivity to the X-ray detected thereby, although in certain instances this is not essential. The relative ion sensitivity of the gases in chambers 21 and 23 is maintained the same by applying the same collecting potentials to the chambers and equalizing the pressure and purity of the gases in the two chambers. This result is achieved by allowing gases from chambers 21 and 23 to communicate with each other without permitting migration of ions between the chambers. This is achieved in chamber 21 by overcoming the diffusion forces of the ions with a strong electric field and in chamber 23 by providing relatively long holes (holes considerably greater than the mean free path of an ion) in a wall between chambers 21 and 23.

Chamber 23 is provided with an annular, aluminum window 25 which absorbs a very significant percentage (on the order of 89 percent) of the negatively directed energy from iron sheet 17, while absorbing a considerably lower percentage (on the order of 60 percent) of the more intense negatively directed energy from zinc coating 16. The Compton radiation negatively directed from iron sheet 17 has such a high energy level that it is effectively unabsorbed by window 25 and the noble gas in chamber 23. Thereby, the current derived at electrode 24 can be mathematically related, over a predetermined range, to the thickness of zinc coating 16. Ionization of the gas in chamber 23 due to the zinc coating is an exponentially increasing function of coating thickness, which function has a zero value for a zero thickness of coating 16. The ionization in chamber 23 in response to 6.4 KeV radiation from sheet 17 is an exponentially decreasing function, having a finite, non-zero value for zinc coating of zero. Compton radiation effecting ionization of the gas in chamber 23 decreases from a finite value for a zinc coating of zero to a lower level for a very thick coating of zinc. The Compton radiation decrease is at a much slower rate than the two exponential rates for relatively thick coatings.

The ionization level of the gas in chamber 23, due to these three ionization effects, accurately represents over a limited range, the thickness of zinc coating 16 in accordance with $$I_m = I_0 + kI_0(1 - e^{-a\mu p w})$$

(1), where:

$I_m$ equals the current derived from electrode 24,
$I_0$ is the current derived by electrode 24 for a zinc coating weight of zero,
$K$ equals a proportionality constant,
$e$ equals the base of natural logarithms,
$a$ equals a proportionality constant,
$\mu$ equals a factor dependent upon the attenuation characteristics of coating 16 for the X-ray beam being transmitted through it,
$p$ equals the density of zinc coating 16, and
$w$ equals the coating thickness, expressed as ounces per square foot.

Equation (1) is valid only over a limited region of between 0 and approximately 1.6 ounces per square foot of zinc coating 16. For coating thicknesses greater than approximately 1.6 ounces per square foot, the Compton radiation causes a change in the exponential relationship of Equation (1) and the equation is no longer an accurate representation of coating thickness. Over most practical thicknesses of coating 16 the current derived at electrode 24 is, therefore, the predetermined mathematical relationship of Equation (1).

In Equation 1, the term $I_0$ is subject to variation due to drifting of X-ray source 11. Drifting of source 11 occurs even though power supply 15 is current regulated. To prevent drifting of source 11 from affecting the accuracy of the measurement signal derived by electrode 24, the current levels derived by electrodes 22 and 24 are combined in ratio circuit 31, after having been converted into voltage levels by electrometers 32 and 33, respectively. Electrometer circuits 32 and 33 each include the usual high impedance input resistor and a low pass filter circuit to substantially eliminate voltage variations due to variations of the amplitudes of the currents derived by electrodes 22 and 24 in response to statistical variations of the X-ray beam derived from source 11. The output signal of ratio circuit 31 has the same form as Equation (1), except that the value of $I_0$ is stabilized due to the output of the electrometer circuit 33 being divided by the output of electrometer circuit 32.

The exponentially increasing relationship of Equation (1), relating the output signal of divider or ratio circuit 31 to the thickness of coating 16, is converted into an exponentially decreasing function of output signal versus coating thickness by circuit 132.

To convert the response of Equation (1) into Equation (2), circuit 132 includes summing circuit 133 responsive to the positive output signal of ratio circuit 31 and a constant negative signal derived from slider 34 of potentiometer 35. Slider 34 is set at a point whereby the response of ratio circuit 31 is reduced so that there is a zero output signal of summer 133 for a perdetermined finite thickness of zinc coating 16. The position of potentiometer 34 is periodically adjusted during standardization, as occurs on the order of once every half hour, when the measuring operation is terminated and a first standard sample, in the form of an iron sheet having the predetermined zinc coating thickness deposited thereon is substituted for the sheet being measured. The setting of potentiometer 34 is adjusted during the standardization procedure with the first sample in the X-ray source 11 beam field of view until a zero reading is derived from circuit 132, as indicated by meter 36 at the output terminal of the circuit. Adjustment of potentiometer 34 can be manual or automatic in response to the voltage level at the output of circuit 132.

The coating thickness of the first standard sample is within the range over which the exponential relationship of Equation (1) is an accurate representation of coating thickness. The first standard sample coating thickness should also be sufficiently displaced from zero to enable accurate two-point standardization to be attained. It has been found that a thickness of between 1.3 and 1.5 ounces per square foot provides admirable results.

The output of summing circuit 133 is fed to a variable gain, polarity reversing amplifier 37 which reverses the slope direction of the exponential term in Equation (1) and controls the slope magnitude, $E_0$, of the exponential term. The slope magnitude is determined by the gain of amplifier 37, which is controlled by the setting of slider 38 of potentiometer 39. The setting of slider 38 adjusts the gain of amplifier 37 so that the sensitivity of the measuring circuit corresponds with the desired gauge sensitivity and the slope of the exponential curve is appropriately adjusted. The setting of slider 38 is performed during standardization, after the setting of slider 34 has been adjusted, by placing a second standard sample, consisting of an iron substrate, i.e., a zero coating of zinc on an iron substrate, in the field of view of the X-ray beam derived by source 11. With the second standard sample in situ, the setting of slider 38 is adjusted until a predetermined output voltage is read from meter 36. This operation can be performed either automatically or manually. By adjusting the setting of slider 34 prior to adjustment of the setting of slider 38, the gauge is standardized in a noniterative manner, whereby the gauge is accurately standardized by performing the two named steps, without repeating any of the steps, and the output signal magnitude of circuit 132 is related to coating thickness in accordance with Equation (2), except for an offset factor.

The offset factor is completely independent of any gauge parameters subject to drift or change and therefore can be eliminated by an a priori determined constant voltage. To this end, the output of circuit 132 is linearly combined in a subtractive manner in summing network 40 with a constant offset voltage derived from fixed slider 141 of potentiometer 142. The voltage derived from slider 141 is fed to network 40 through normally closed switch 143. Switch 143 is open circuited during standardization with the first sample so that the voltage at slider 141 does not effect the reading of meter 36.

The output signal of circuit 40 is fed to logarithmic amplifier 41 which converts the exponential relationship to a linear, straight-line relationship between output voltage and coating thickness, wherein an output voltage of zero is commensurate with a zinc coating thickness of zero ounces per square foot. The output signal of logarithmic amplifier 41 is fed to appropriate meters, visual displays or chart recorders (not shown).

Reference is now made to FIGS. 2–4 of the drawing wherein there are illustrated mechanical detail views of a preferred embodiment of a composite structure comprising reference and measuring chambers 21 and 23 which contain a noble gas that is ionized in response to absorption of the X-rays. The composite structure includes a cylindrical housing 42 having an outer, cylindrical side wall 43, an apertured circular disc 44 forming an upper wall of the housing, and disc 45 which comprises the lower wall of the housing and has a larger aperture than the aperture in disc 44. Disc 44 is preferably fabricated of brass and has sufficient thickness, e.g., one-fourth inch, to absorb virtually all of the X-ray radiation impinging thereon. Positioned in the aperture of disc 45 is thin aluminum, annular plate 46, which is sealed to end plate 45 and cylinder 47 to provide a gas seal for chamber 23.

Plate 46 functions as window 25 to enable secondary X-rays from zinc coating 16 and Compton radiation to be transmitted through it, while substantially attenuating the secondary X-rays in the 6.4 KeV region resulting from fluorescence of iron sheet 17. The gas in chamber 21 absorbs between about 1 to 10 percent of the X-ray radiation in the beam transmitted through the chamber by source 11. The gas in chamber 23 absorbs a significant (about 80 percent) portion of the 6.4 KeV and 8.2 KeV energy derived from substrate 17 and coating 16 and transmitted through window 25 but less than 5 percent of the higher level energy. Most of the backscattered Compton energy is absorbed by plate 44 and, therefore, has little effect on the ionization of the gas in chamber 23. Differential absorption between the high and low energy radiation is effected by selecting the product of the density and attenuation characteristic of the gas in chamber 23 and length of the chamber along the axis of cylinder 43 appropriately.

A significant portion of a gas flow baffle provided between reference chamber 21 and measuring chamber 23 is formed by a brass cylinder 47 that is concentric with circular wall 43 and extends longitudinally between plates 44 and 45. A relatively large, circular aperture is provided in the right side of cylinder 47 (as viewed in FIG. 2) toward the top of the cylinder to permit ring 48, which forms electrode 22, to fit into chamber 21. Ring 48 is mechanically and electrically connected to an arm of connector 49 that is positioned in cylinder 151. Cylinder 151, which forms the remainder of the baffle between chambers 21 and 23, has its longitudinal axis disposed at right angles to the common longitudinal axis of cylinders 43 and 47. Cylinder 151 is provided with end cap 52 which fits into a circular aperture of cylinder 43 and includes an aperture into which insulating stud 50 is sealingly held in situ. Centrally located within stud 50 and electrically connected to connector 49 is an electric lead that extends through end cap 52. Thereby, electrical connections are made to connector 49 and ring 48 so that the connector and ring are maintained at a potential different from that of the remainder of the parts included in housing 42 to provide a signal lead for electrode 22 exterior of housing 43.

The edge of end cap 52 is sealed in the aperture of cylinder 43 from the atmosphere so that gas cannot flow through the end wall between the outside atmosphere and chamber 21. Further flow of gas between chamber 21 and the atmosphere is prevented by relatively thin aluminum windows 51 and 152 at the top and bottom, respectively, of chamber 21. Windows 151 and 152 respectively enable the X-ray beam of source 11 to enter chamber 21 and exit the chamber without significantly changing the beam intensity. Window 151 is held in situ by a seal in the aperture of ring 53 into which it fits, while window 152 is held in situ by a seal on the upper edge of cylinder 54. Ring 53 and cylinder 54 are respectively fixedly mounted to the upper and lower edges of cylinder 45, with which they are concentric.

To define the rectangular radiation beam cast by X-ray source 11 on coating 16 and sheet 17, apertured disc 55 is fixedly secured against the inner wall of cylinder 47 so that it also holds cylinder 54 in place. Disc 55 is fabricated from a relatively thick brass stock so that it effectively blocks the portions of the X-ray beam impinging thereon. The disc is provided with a rectangular aperture, having dimensions on the order of 1.5 × 0.75 inches to shape the cross section of the beam appropriately. The window or aperture in disc 55 may be left open or a thin, X-ray transparent aluminum sheet may be inserted therein if it is desired to prevent dust from reaching the interior of cylinder 54 and window 152.

Electrode 24, in chamber 23, comprises ring 56 that is concentric with cylinder 47 and has a diameter approximately equal to the median between the diameters of cylinder 47 and circular end wall 43. Ring 56 is located approximately halfway along the length of cylinder 43 to enable radiation from the material to pass through a significant portion of gas in chamber 23, whreby there is an appreciable density of ionized gas in the vicinity of ring 56. To prevent mechanical and electrical contact between ring 56 and cylinder 151 while permitting the ring to be located as far as possible away from window 25, the ring is provided with cutout segment 156. Ring 56 is electrically and mechanically connected to connector arm 57 which is mechanically secured in situ by insulating stud 58 that is fixedly suspended from end plate 44. An electric lead extends centrally through stud 58 to connector 57 so that a signal responsive to the ionization current collected by ring 56 can be derived exteriorly of housing 42 and the ring and connector 57 are maintained at a potential different from the voltage of the remaining parts of housing 42. All of housing 42 except rings 48 and 56 and the parts electrically connected thereto are maintained at the same relatively high d.c. potential, on the order of 900 volts, by a source and connection (not shown) to provide a potential that enables the gas ions in chambers 21 and 23 to be collected by electrodes 22 and 24.

Chambers 21 and 23 are sealed from each other and the atmosphere by virtue of the described construction, except for a very limited path between the chambers which exists through long and narrow passageway means comprising radially extending bores 59 at the end of cylinder 151 closest to cylinder 43. The position of bores 59 considerably outside of ring 56 prevents any of the ionized gas molecules in chamber 23 from reaching the bores. Bores 59 have a diameter on the order of several mils, beng illustrated with much larger diameters to facilitate the presentation. The length of the bores 59 through cylinder 43, on the order of approximately 0.1 inches, is considerably in excess of the mean free path of an ionized gas molecule in chamber 23. Thereby, bores 59 enable gas molecules to circulate between chambers 21 and 23 while preventing the ionized molecules which reach the openings of bores 59 on the outer wall of cylinder 151 from migrating between the chambers because ionized molecules collide with the walls of the small diameter bores 59 and lose their charge.

Ionized molecules in chamber 21, where the density of the ionized molecules is considerably greater than in chamber 23, are prevented from migrating outside of the region of ring 48 and into chamber 23 because the electric field intensity in chamber 21 in the vicinity of ring 48 produces a force greater than the diffusion force of the ionized molecules. In particular, windows 51 and 152 are each at a potential on the order of 900 volts, while ring 48 is maintained at a potential of approximately zero volts by its connection to electrometer circuit 32. With a spacing of less than an inch between ring 48 and each of windows 51 and 152 and the indicated potential difference between the windows and ring, there exists an electric field gradient of approximately 1,000 volts per inch in the portion of chamber 21 through which the X-ray beam is propagated. The magnitude of this electric field is sufficient to overcome the diffusion force of the ionized gas and prevents the gas ions from migrating outside of the beam region. Thereby, the ionizing currents in chambers 21 and 23 are different from each other and dependent upon the amount of X-ray radiation impinging on the chambers, but a flow path is provided between the two chambers for the un-ionized gas molecules. Because of the gas flow between chambers 21 and 23, the gas pressure and purity therein are equalized and the chambers have the same relative sensitivites.

Chambers 21 and 23 are separated from each other by walls having sufficient thickness and density to substantially prevent any radiation coupling between the chambers. This result is achieved by forming the walls of cylinders 47 and 151 of stock having sufficient density and thickness to absorb virtually all radiation impinging thereon. For example, brass stock having a one-eighth inch thickness has been found satisfactory.

Chamber housing 42 has been designed so that ions can be collected from virtually all regions in which they might be formed, i.e., there are no ion "dead spots" in housing 42. This result is achieved by forming chambers 21 and 23 so that there is an electric field at all places therein away from solid surfaces, i.e., at all places where ions may be formed. To this end, ring 56 is closed on itself and radiation transparent aluminum window 61 is fixedly mounted in ring 48. Further, cylinder 151 is formed with square shoulders 62, FIG. 4, which abut against plate 44. By designing chambers 21 and 23 so that there are virtually no "ion dead" spots, plateaus in the current vs. voltage characteristics, as a function of constant radiation intensity, are maintained so that accuracy of the chambers is not impaired by variations in the collecting potentials on electrodes 22 and 24.

While there has been described and illustrated one specific embodiment of the invention, it will be clear that variations in the details of the embodiment specifically illustrated and described may be made without departing from the true spirit and scope of the invention as defined in the appended claims.

I claim:

1. In a system for monitoring a property of a material irradiated by an X-ray beam subject to variations in intensity, said material fluorescing to emit energy in response to the X-ray beam impinging thereon, an X-ray detector chamber positioned to transmit the X-ray beam on to the material, said X-ray detector including means for deriving a first signal indicative of the intensity of the X-ray beam impinging on the transmitted material, an energy detector positioned on the same side of the material as the X-ray detector to intercept the energy, said energy detector including means responsive to the intercepted energy for deriving a second signal indicative of the intensity of said intercepted energy.

2. The system of claim 1 wherein the energy detector includes a second chamber responsive to X-ray energy resulting from fluorescing of the material, and further including means for maintaining the relative X-ray sensitivity of the two chambers substantially the same.

3. The system of claim 1 wherein the chamber is filled with a gas ionized by said beam and includes a pair of windows in the path of the beam and transparent thereto, one of said windows enabling the beam to enter the chamber and the other window enabling the beam to exit the chamber.

4. The system of claim 1 further including means for combining the first and second signals to derive another signal having an amplitude substantially independent of said variations.

5. A detector for ionizing radiation comprising first and second chambers filled with a gas ionized by said radiation, said chambers being provided with windows transparent to said radiation, a separate electrode in each chamber responsive to the ionized gas in the respective chamber, and means for enabling gas flow between the chambers while preventing the migration of gas ions between the chambers.

6. The apparatus of claim 5 wherein the means for preventing gas ion migration includes means for establishing an electric field in the first chamber that exerts a greater force on the ionized gas molecules therein than the diffusion forces of the molecules, whereby gas ions in the first chamber are prevented from migrating to the second chamber.

7. The apparatus of claim 6 wherein the means for preventing gas ion migration includes narrow passageway means between the chambers for enabling gas to flow between the chambers, said passageway means being sufficiently long and narrow to prevent the migration of gas ions in the second chamber into the first chamber.

8. The apparatus of claim 5 wherein the means for preventing gas ion migration includes narrow passageway means between the chambers for enabling gas to flow between the chambers, said passageway means being sufficiently long and narrow to prevent the migration of gas ions in the second chamber into the first chamber.

9. Apparatus for monitoring a beam of ionizing radiation incident on a material and for separately monitoring energy derived from said material's fluorescing in response to the beam comprising a first chamber filled with a gas ionized by said beam, said chamber including a pair of windows in the path of the beam and transparent thereto, one of said windows enabling the beam to enter the chamber and the other window enabling the beam to exit the chamber and impinge on said material, said chamber including an electrode responsive to the ionized gas in the chamber, a detector located on the same side of the material as the chamber, said detector being responsive to the energy, and positioned so as to be out of the path of the beam exiting the chamber.

10. The apparatus of claim 9 wherein the detector is concentric with the chamber.

11. The apparatus of claim 9 wherein the detector includes a second chamber containing a gas ionized in response to the energy, a window in said second chamber transparent to the energy for passing the energy into the second chamber to ionize the gas therein, said second chamber including an electrode responsive to the ionized gas in the second chamber.

12. The apparatus of claim 11 further including means for enabling gas to flow between the chambers while preventing the migration of gas ions between the chambers.

13. The apparatus of claim 12 wherein the means for preventing gas ion migration includes means for establishing an electric field in the first chamber that exerts a greater force on the ionized gas molecules therein than the diffusion forces of the molecules, whereby gas ions in the first chamber are prevented from migrating to the second chamber.

14. The apparatus of claim 13 wherein the means for preventing gas ion migration includes a narrow passageway means between the chambers for enabling gas to flow between the chambers, said passageway means being sufficiently long and narrow to prevent the migration of gas ions in the second chamber from reaching the first chamber.

15. The apparatus of claim 12 wherein the means for preventing gas ion migration includes a narrow passageway means between the chambers for enabling gas to flow between the chambers, said passageway means being sufficiently long and narrow to prevent the migration of gas ions in the second chamber from reaching the first chamber.

16. A system for measuring the thickness of a coating on a metal substrate comprising an X-ray beam source, the beam of the source being subject to variations in intensity, said beam impinging on the coating and causing the coating and substrate to fluoresce and derive energy at different energy levels, an X-ray detector chamber positioned to transmit the X-ray beam impinging on to the coating, said X-ray detector including means for deriving a first signal indicative of the intensity of the X-ray beam impinging on the coating, an energy detector positioned to intercept and be responsive to the energy, said energy detector including means responsive to intercepted backscattered energy for deriving a second signal indicative of the coating thickness, and means for combining the first and second signals to derive another signal indicative of the coating thickness and substantially independent of said variations.

17. The system of claim 16 wherein the another signal varies exponentially from a first finite, nonzero value for a zero coating thickness to a second value for a predetermined coating thickness and changes in characteristic from the second value for thicknesses greater than the predetermined thickness, and means responsive to the another signal for deriving an indication of the coating thickness over a coating thickness range from zero to the predetermined thickness.

18. The system of claim 16 wherein the means for deriving the second signal includes means for deriving a signal amplitude that varies exponentially from a first finite, nonzero value for a zero coating thickness to a second value for a predetermined coating thickness and changes in characteristic from the second value for thicknesses greater than the predetermined thickness.

19. The system of claim 18 wherein the energy detector includes an ionizable gas ionized in response to secondary X-rays derived from the coating and substrate, said detector including a window for passing energy levels derived from the coating to a greater extent than energy levels derived from the substrate.

20. A detector for ionizing radiation comprising first and second chambers filled with a gas ionized by said radiation, said chambers being provided with windows transparent to said radiation, a separate electrode in each chamber responsive to the ionized gas in the respective chamber, and means for enabling gas flow between the chambers and means for preventing gas ion migration between the chambers including means for establishing an electric field in the first chamber that exerts a greater force on the ionized gas molecules therein than the diffusion forces of the molecules, said gas flow enabling means comprising narrow passageway means between the chambers and located out of the high electric field regions therein, said passageway means being sufficiently long and narrow to further prevent the migration of gas ions in the second chamber into the first chamber.

21. Apparatus for measuring a property of a material, which comprises a first ionization chamber including a first volume of gas, a second ionization chamber including a second volume of gas commingling with and at least partially surrounding said first volume of gas, means for directing an X-ray beam subject to intensity variations through said first ionization chamber and onto said material, means for transmitting into said second ionization chamber radiation returned backwardly from said material, means for measuring the ionization produced by said directed radiation in said first ionization chamber to produce a first signal, means for measuring the ionization produced by said transmitted radiation in said second ionization chamber to produce a second signal which is substantially independent of said first signal, and means for producing an output signal in response to said first and second sgnals to provide a measure of said material property which is substantially independent of said X-ray beam intensity variations.

22. Apparatus for measuring a coating material on a substrate material having an atomic number different from that of the coating material, which comprises
a first ionization chamber including a first volume of gas,
a second ionization chamber including a second volume of gas commingling with and at least partially surrounding said first volume of gas,
means for directing through said first ionization chamber and onto said materials an X-ray beam subject to intensity variations and having at least sufficient energy to excite the emission of fluorescent X radiations from both said coating and said substrate,
means for filtering radiation returned backwardly from said material to substantially attenuate one of said fluorescent X radiations while effectively transmitting the other fluorescent X radiation into said second ionization chamber,
means for measuring the ionization produced by said directed radiation in said first ionization chamber to produce a first signal,
means for measuring the ionization produced by said transmitted fluorescent radiation in said second ionization chamber to produce a second signal which is substantially independent of said first signal, and
means for producing an output signal in response to said first and second signals to provide a measure of said coating material which is substantially independent of said X-ray beam intensity variations.

23. Apparatus as in claim 22 wherein said directed X-ray beam has sufficient energy to produce a substantial component of Compton X radiation from at least one of said materials, wherein said gas composition and the length of said second volume of gas constitute means to transmit said Compton X radiation without substantial attenuation while substantially absorbing said fluorescent X radiation to produce ionization in said second volume of gas. absorbing 24. The method of measuring a property of a material, which comprises
separating a volume of gas into a first portion and a second portion commingling with and at least partially surrounding said first portion,
directing an X-ray beam subject to intensity variations through said first gas portion and onto said material,
receiving in said second gas portion radiation returned backwardly from said material,
measuring the ionization produced by said directed radiation in said first gas portion and by said received radiation in said second gas portion to produce a pair of separate, independent signals, and
producing an output signal in response to said pair of signals to provide a measure of said material property which is substantially independent of said X-ray beam intensity variations.

25. The method of measuring a coating material on a substrate material having an atomic number different from that of the coating material, which comprises
separating a volume of gas into a first portion and a second portion commingling with and at least partially surrounding said first portion,
directing through said first gas portion and onto said materials an X-ray beam subject to intensity variations and having at least sufficient energy to excite the emission of fluorescent X radiations from both said coating and said substrate,
filtering radiation returned backwardly from said material to substantially attenuate one of said fluorescent X radiations while effectively transmitting the other fluorescent X radiation into said second gas portion,
measuring the ionization produced by said directed radiation in said first gas portion and by said transmitted fluorescent radiation in said second gas portion to produce a pair of separate, independent signals, and
producing an output signal in response to said pair of signals to provide a measure of said coating material which is substantially independent of said X-ray beam intensity variations.

26. The method of claim 25 wherein said directed X-ray beam has sufficient energy to produce a substantial component of Compton X radiation from at least one of said materials, and which comprises
selecting the composition of said gas and the length of said second gas portion so as to transmit said Compton X radiation without substantial attenuation while substantially absorbing said fluorescent X radiation to produce ionization in said second gas portion.

27. In a device for measuring a property of a material, a source for generating an X-ray beam directed at the material so that ionizing radiation is back scattered from the material in response to the material being irradiated by the X-ray beam, a housing positioned between said source and the material, said housing including first and second chambers having walls substantially opaque to the X-ray beam and the back scattered radiation, said first and second chambers being respectively filled with gas that ionizes in response tp ionizing radiation from the source and ionizing radiation back scattered from the material, the first chamber including: an entrance window and an exit window for the X-ray beam, said windows being aligned and positioned so that the X-ray beam passes through them and the beam passing through the exit window does not impinge on the second chamber, a first electrode responsive to the ionized gas in the first chamber arranged so that it does not substantially attenuate the beam, and means for biasing the first electrode at a potential different from a potential for walls of the first chamber; the second chamber including: another window transparent to back scattered radiation from the material, said another window encircling the beam exiting the exit window and positioned to enable the back scattered radiation to enter the second chamber, a second electrode responsive to ionized gas in the second chamber, means for biasing the second electrode at a potential different from a potential for the walls of the second chamber; and wall means between the chambers for substantially preventing penetrating radiation in one chamber from reaching the other chamber.

28. The device of claim 27 wherein the first and second chambers and the first and second electrodes include means for collecting ions on the first and second electrodes from virtually all regions from which ions might be formed in the first and second chambers in response to the X-ray beams and the back scattered radiation.

29. The device of claim 28 wherein all walls of the chambers are metal and are at the same potential and the means for collecting includes means for forming electric fields in said chambers at substantially all places in the chambers away from the walls of the chambers.

30. The device of claim 29 wherein the second electrode is closed on itself.

31. The device of claim 30 wherein the first electrode includes an equi-potential window transparent to the X-ray beams through which the beams pass between the entrance and exit windows.

32. The device of claim 28 wherein the first electrode includes an equi-potential window transparent to the X-ray beams through which the beams pass between the entrance and exit windows.

33. The apparatus of claim 27 further including means for enabling gas to flow between the chambers while preventing the migration of gas ions between the chambers.

34. The apparatus of claim 33 wherein the means for preventing gas ion migration includes means for establishing an electric field in the first chamber that exerts a greater force on the ionized gas molecules therein than the diffusion forces of the molecules, whereby gas ions in the first chamber are prevented from migrating to the second chamber.

35. The apparatus of claim 34 wherein the means for preventing gas ion migration includes a narrow passageway means between the chambers for enabling gas to flow between the chambers, said passageway means being sufficiently long and narrow to prevent the migration of gas ions in the second chamber from reaching the first chamber.

36. The device of claim 35 wherein the first chamber is formed to have a longitudinal axis at right angles to the direction the beam propagates through the entrance and exit windows, said passageway means being located about the longitudinal axis at an end of said first chamber remote from the first electrode, and in proximity to a wall of the housing.

37. The device of claim 36 wherein the windows have an axis common with each other and with both of said electrodes, said first chamber including a wall segment having a longitudinal extent at right angles to the common axis, said second electrode being a ring having a diameter considerably less than the radial distance of the passageway means from the common axis so that ions in the gas are substantially prevented from reaching the passageway means.

38. The device of claim 37 wherein the wall segment is cylindrical and the second electrode includes a cut out segment surrounding but not electrically contacting a portion of the cylindrical wall segment.

39. The device of claim 27 wherein the windows have a common axis with each other and with both of said electrodes, said first chamber including a wall segment having a longitudinal extent at right angles to the common axis, said second electrode being a ring, said wall segment being cylindrical and the second electrode including a cut out segment surrounding but not electrically contacting a portion of the cylindrical wall segment.

40. The device of claim 27 wherein the first and second electrodes respectively derive currents in response to the beam and the back scattered radiation to which the gas in the second chamber is responsive, said first and second currents including common components responsive to and indicative of variations in the intensity of the X-ray beam, and means for combining said currents to remove the common component from the second current.

41. The device of claim 40 wherein the material back scatters radiation in more than one spectral interval, the another window passes the back scattered radiation in more than one of said intervals while substantially attenuating the majority of the energy in another of the regions, the gas in the chamber having a density and length in the direction the back scattered energy propagates sufficient to absorb the energy in only one of said passed intervals while absorbing only a small amount of the other passed energy.

* * * * *